United States Patent
Bird et al.

(10) Patent No.: US 6,757,672 B2
(45) Date of Patent: Jun. 29, 2004

(54) MODIFYING A RELATIONAL DATABASE

(75) Inventors: Mark W. Bird, Highland, UT (US);
Plinio Pimentel, Highland, UT (US);
James Bish, Antelope, CA (US)

(73) Assignee: Intel Corporation, Santa Clara, CA (US)

(*) Notice: Subject to any disclaimer, the term of this patent is extended or adjusted under 35 U.S.C. 154(b) by 212 days.

(21) Appl. No.: 09/773,401

(22) Filed: Jan. 31, 2001

(65) Prior Publication Data

US 2002/0103780 A1 Aug. 1, 2002

(51) Int. Cl.[7] .............................................. G06F 17/03
(52) U.S. Cl. .............................................. 707/3; 707/4
(58) Field of Search ................................ 707/1, 2, 3, 4, 707/5, 6, 7, 8, 100, 101, 102, 104.1, 513

(56) References Cited

U.S. PATENT DOCUMENTS 6,366,934 B1 * 4/2002 Cheng et al. ............... 715/513

OTHER PUBLICATIONS

A. Deutsch, M. Fernandez, and D. Suciu. Storing Semistructured Data with STORED. In Proc. of the ACM SIGMOD Conference on Management of Data, Jun. 1999.*
Jayavel Shanmugasundaram, Kristin Tufte, Chun Zhang, Gang He, David J. DeWitt, Jeffrey F. Naughton: Relational Databases for Querying XML Documents:Limitations and Opportunities. VLDB 1999: 302–314.*
Nauer, Peter (ed.), "Revised Report on the Algorithmic Language ALGOL 60", Communications of the Association for Computer Machinery, 3(5):299–314, May 1960.

* cited by examiner

Primary Examiner—Diane D. Mizrahi
Assistant Examiner—Yicun Wu
(74) Attorney, Agent, or Firm—Fish & Richardson P.C.

(57) ABSTRACT

Elements of hierarchical data are obtained. Metadata, which describes a data structure, is read from a relational database and examined to determine if there is a place in the data structure for the elements. If the elements do not fit within the data structure, the relational database is automatically modified to accommodate the elements. The modifications are effected by modifying the metadata of the relational database.

39 Claims, 4 Drawing Sheets

MODIFYING A RELATIONAL DATABASE

TECHNICAL FIELD

This invention relates to modifying a relational database.

BACKGROUND

The data structure of a relational database may include one or more tables organized hierarchically by column and row. The tables are defined by metadata in the data structure. A table contains information about a subject, such as computer. Each column of the table relates to the subject in some way. For example, if the subject is a computer, a column of the table may define processor speeds available for that computer. The rows provide one or more elements of the column. For example, the "processor speed" column may include elements such as 400 MHz (megahertz), 500 MHz, and 700 MHz.

DETAILED DESCRIPTION

Figure 1:
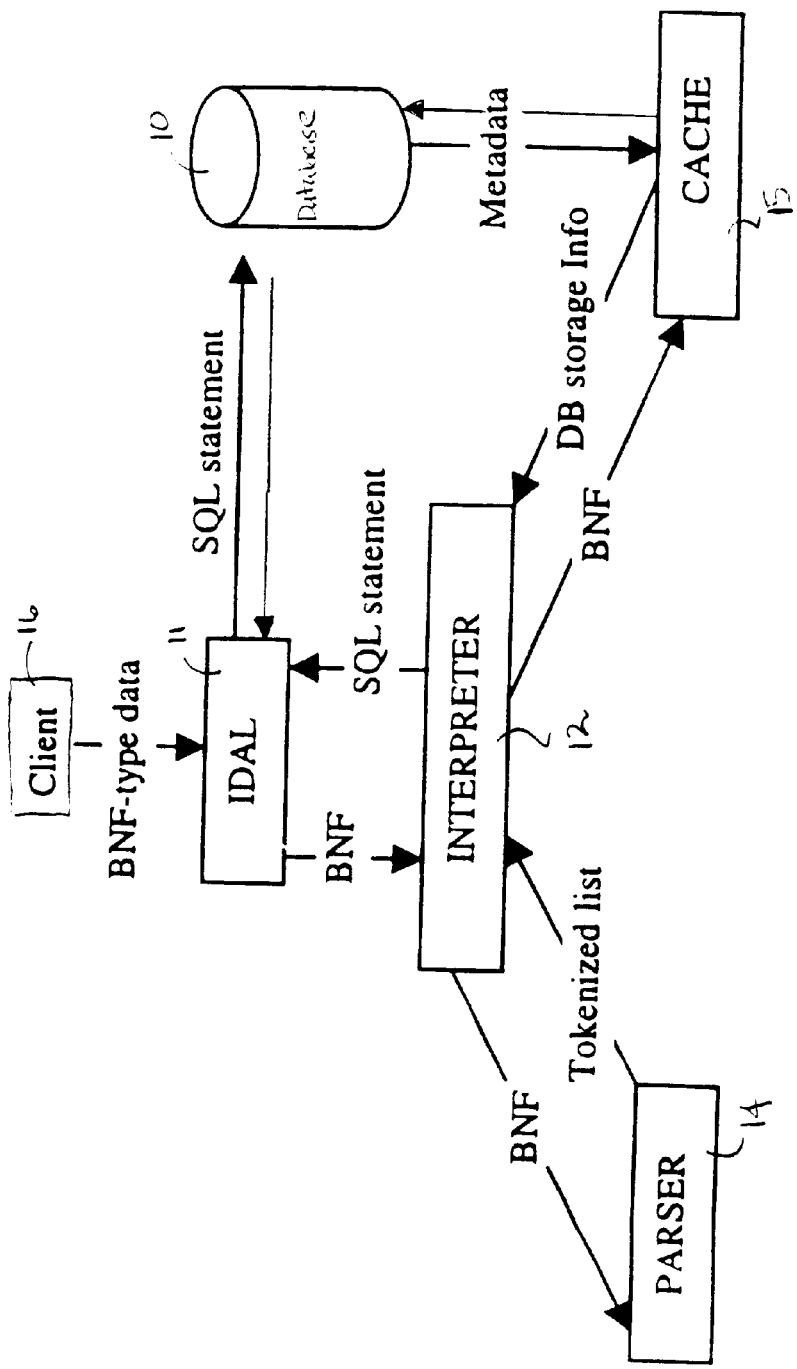
FIG. 1 is a block diagram of software modules for modifying a relational database.

FIG. 1 shows software modules for modifying, and reading data from, a relational database 10. The software modules include Internet Data Abstraction Layer (IDAL) 11, interpreter 12, parser 14, and cache module 15.

Briefly, IDAL 11 acts as an interface between client 16, database 10, and interpreter 12. Interpreter 12 may receive hierarchical data (defined below), other data, and instructions from IDAL 11, cache module 15, and parser 14, and may convert these to formats that are understandable to each of the respective modules. Parser 14 may parse (i.e., separate) hierarchical data (defined below) into individual elements and may pass a resulting list of such elements to interpreter 12. Cache module 15 may read and write metadata (described below) to/from relational database 10, and provide information defining storage locations in the data structure of database 10 to interpreter 12. The term "metadata", as used herein, may be used to define the data structure of database 10 and may include information identifying tables and their columns and rows within database 10, as well as the data that is stored in those tables. The role of each module in a process 20 (FIG. 2) for modifying the data structure of database 10 is described presently.

In process 20, IDAL 11 may receive (21) hierarchical data from client 16. Client 16 may be a remote computer, server or other processing device that wants to read and/or write data in database 10. Writing will be addressed first.

The hierarchical data may define relationships between two or more elements to be stored in database 10. In this embodiment, the hierarchical data may be formatted as follows:

ELEMENT1.ELEMENT2.ELEMENT3 . . . ELEMENTn, where "n" is an integer greater than one. ELEMENT1 is at the highest level of the hierarchy, ELEMENT2 is below ELEMENT1, and so on. By way of example, the hierarchical data might contain values specifying computer.processor.speed=450 Mhz, where the argument "=450 Mhz" constitutes the data to be written. The value of the element for "computer" may indicate a type of computer, the value of the element for "processor" may indicate that the data relates to a processor in the computer, and the value of the element for "speed" may indicate a speed of the processor for the computer.

The hierarchical data may be formatted as Backus-Naur Form (BNF) data in this embodiment. Nauer, Peter (ed.), "Revised Report on the Algorithmic Language ALGOL 60", Communications of the Association for Computer Machinery, Vol. 3, No. 5, pp 299–314 (May 1960). BNF is a commonly used notation for defining the grammar of a command structure. The commands noted above may specify the data syntax.

In process 20, IDAL 11 may pass the hierarchical data to interpreter 12, which identifies the hierarchical data and passes it to parser 14. Parser 14 may parse (22) the hierarchical data into its individual elements, e.g., ELEMENT1 (computer), ELEMENT2 (processor), ELEMENT3 (speed), ELEMENT4(=), and ELEMENT5 (450 Mhz). Parser 14 may generate a tokenized list of these elements and pass the tokenized list to interpreter 12. Each element is a token in the list. Interpreter 12 may pass the tokenized list to cache module 15.

Cache module 15 may receive the tokenized list from interpreter 12 and may determine (23) whether the elements specified in that list fit within the data structure of relational database 10. To do this, cache module 15 may read (24) metadata from database 10 and may examine (25) the metadata to determine if database 10 can accommodate the specified data. As noted, the metadata may define tables and their columns and rows within database 10. Cache module 15 therefore may examine the metadata to determine if there is a table, and corresponding column(s) in that table, for the specified data, such as "processor speed".

If there is a table and columns for the new data, cache module 15 may generate database storage information identifying the locations, in database 10, of the table and columns. The database storage information may be sent to interpreter 12, where it may be processed in the manner described below. On the other hand, if there is not a column for the specified data, cache module 15 may modify (26) the metadata to contain the new item and either finds a predetermined location or creates a location within the data structure of the database. This may include a new column, or even a new table, if necessary.

By way of contrast, conventional storage techniques were limited to the existing tables and columns in database 10. If there was no definition for the new data, the data could not be stored using conventional storage techniques. Process 20, however, allows a client to store new data within database 10 by changing the metadata of database 10 and, possibly, modifying the structure of database 10.

By way of example, assume that database 10 includes a table for "computer", a column for "processor", and elements in that column define a "speed" of the processor. Assume also that client 16 wants to write new hierarchical data to database 10 specifying computer.case.color, where "computer" indicates a type of computer, "case" indicates the housing of the computer, and "color" indicates the color of the housing. If cache module 15 examines the metadata for database 10 and determines that there is no column in the "computer" table for "case", cache module 15 may create a new column by writing new metadata to database 10, thereby defining a new column in the "computer" table for "case". Row elements may be added to the "case" column in the same manner that row elements are routinely added to other columns in the table. Thus, data for "color" may be added to the "case" column. Alternatively, if there are existing rows and columns for computer case color, the metadata in those rows and columns can be altered, without changing the data structure.

Associated with each column of a relational database, such as the "case" column noted above, may be another column that specifies an identifier for each element in that column. The identifiers may be integers and may be used to retrieve corresponding elements from the database. When writing the metadata, cache module 15 may also create the other column and may specify element identifiers in its associated column.

Once the metadata of database 10 has been appropriately modified (if necessary), cache module 15 may generate (27) database storage information and pass that information to interpreter 12. As noted, the database storage information may identify the locations (memory addresses) in database 10, of table(s) and column(s) that can accommodate the new data that client 16 is writing to database 10.

Interpreter 12 may receive the database storage information and may generate (28) instructions for writing the new data to database 10. In this embodiment, the instructions may be an SQL (Structured Query Language) statement, although the invention is not limited as such. The SQL statement may specify where, in database 10, the new data is to be stored and includes the data that is to be stored. In the foregoing example, "450 Mhz" is stored in the database. IDAL 11 may receive the SQL statement and may store (29) the new data in database 10 in accordance with the SQL statement. In this embodiment, IDAL 11 may communicate with database 10 via the ODBC (Open Database Connectivity) protocol; however, the invention is not limited to using ODBC. ODBC version 3.51 is a Microsoft© protocol, ©1999.

Figure 3:
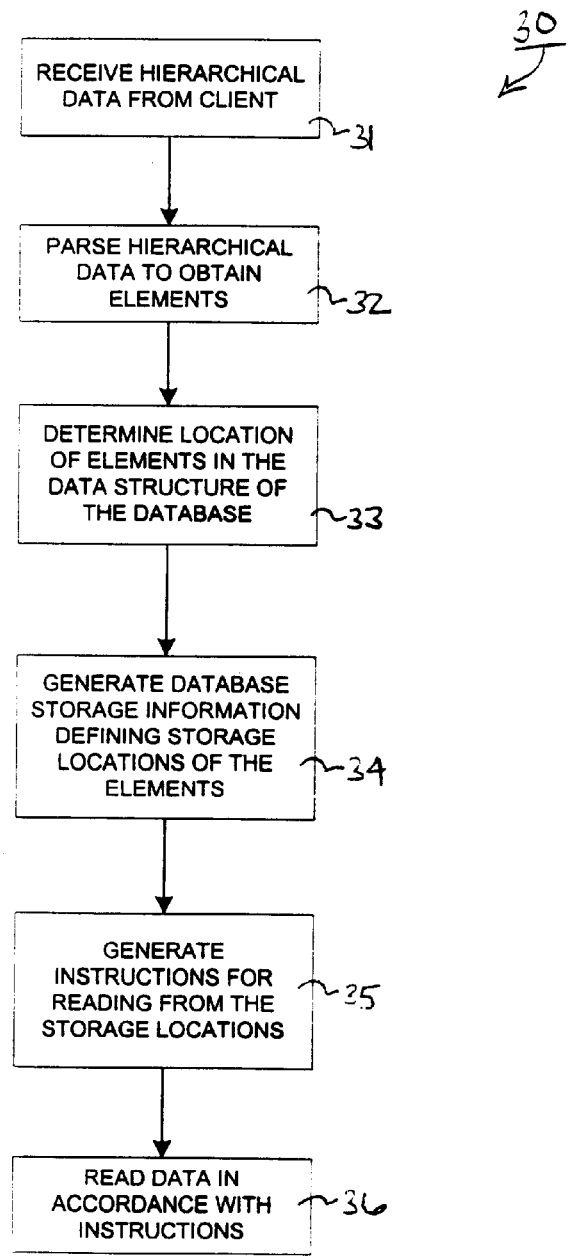
FIG. 3 is a flowchart showing the process performed by the software modules for reading from the relational database.

A process 30 for reading data from database 10 is shown in the flowchart of FIG. 3. In process 30, IDAL 11 may receive (31) a BNF statement ("computer.processor.speed") to read data from database 10 and may pass that statement to interpreter 12. Interpreter 12 may receive the statement and may pass it to parser 14, which may parse (32) the statement to specify what elements of data are to be read. For example, the statement may be to read the processor speed of a computer whose data is stored in database 10. Parser 14 may pass the elements to interpreter 12 as a tokenized list. Interpreter 12 may pass the tokenized list to cache module 15.

Cache module 15 may read the metadata from database 10 (if it has not done so already), and may determine (33) locations of the requested data in database 10. If the requested data is in database 10, cache module 15 may generate (34) database storage instructions, which identify the location(s) in database 10 of the requested data. If the data is not in database 10, these instructions indicate that the data has not been found. Assuming that the data is in database 10, interpreter 12 may generate (35) an SQL statement containing instructions for reading the data from database 10. IDAL 11 may receive the SQL statement, may read (36) the data from database 10, and may pass the data to client 16.

Figure 4:
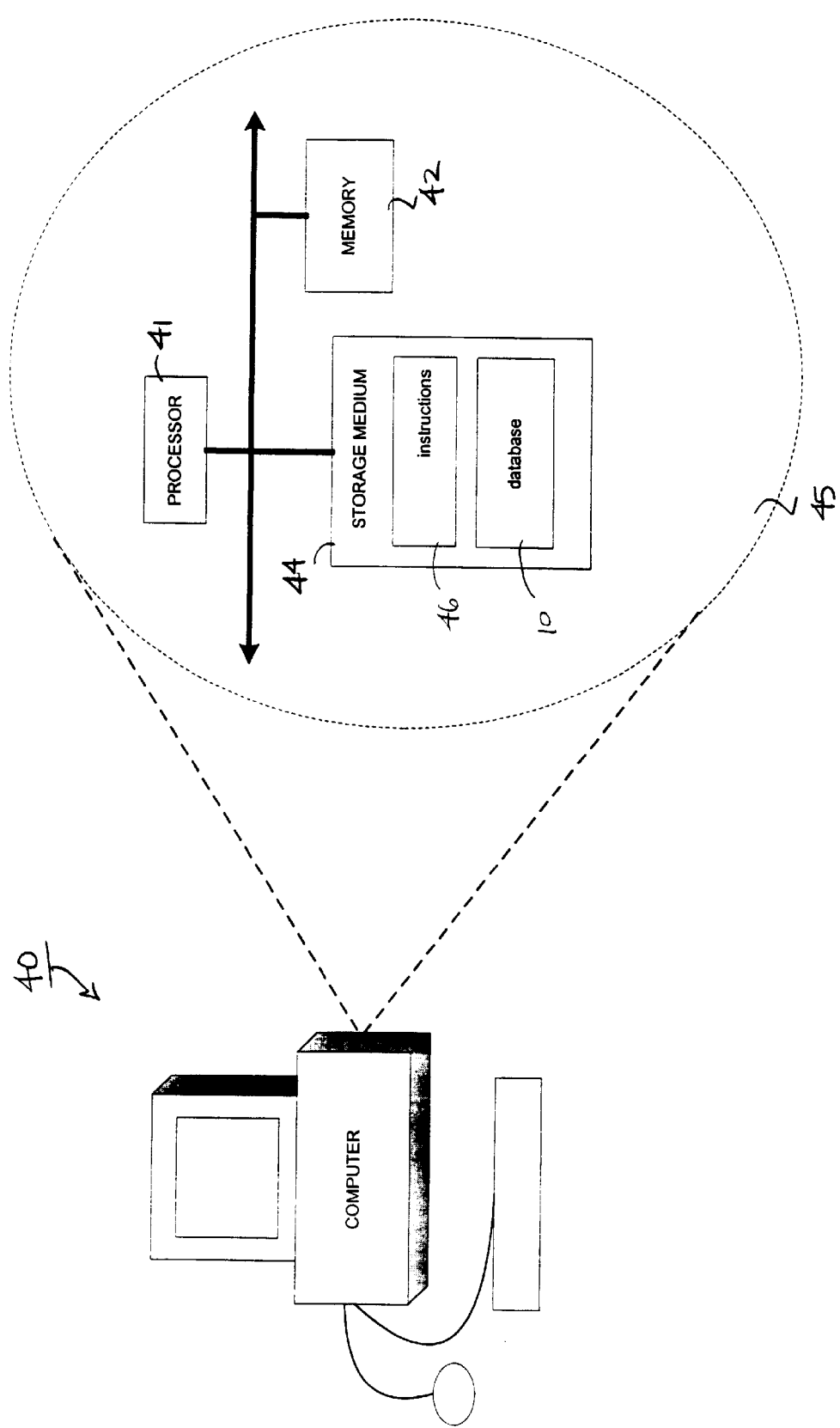
FIG. 4 is a perspective view of hardware on which the processes of FIGS. 2 and 3 may be implemented.

FIG. 4 shows a computer 40 for performing processes 20 and 30. Computer 40 may include a processor 41, a memory 42, and a storage medium 44 (e.g., a hard disk)(see view 45). Storage medium 44 stores database 10 and machine-readable instructions 46 for performing processes 20 and 30. Processor 41 may execute these machine-readable instructions 46 out of memory 42 to perform processes 20 and 30.

Although a personal computer is shown in FIG. 4, processes 20 and 30 are not limited to use with any particular hardware or software configuration; they may find applicability in any computing or processing environment. Processes 20 and 30 may be implemented in hardware, software, or a combination of the two. For example, processes 20 and 30 may be implemented using one or more of logic gates such as NAND and NOR gates, programmable logic such as a field programmable gate array (FPGA), and application-specific integrated circuits (ASICs).

Processes 20 and 30 may be implemented in one or more computer programs executing on programmable computers that each include a processor, a storage medium readable by the processor (including volatile and non-volatile memory and/or storage elements), at least one input device, and one or more output devices. Program code may be applied to data entered using an input device to perform processes 20 and 30 and to generate output information. The output information may be applied to one or more output devices.

Each such program may be implemented in a high level procedural or object-oriented programming language to communicate with a computer system. However, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform processes 20 and 30. Processes 20 and 30 may also be implemented as a machine-readable storage medium, configured with a computer program, where, upon execution, instructions in the computer program cause a computer or other machine to operate in accordance with processes 20 and 30.

It can be appreciated that the embodiments of the invention are not limited to the specific protocols and formats (e.g., BNF, ODBC, SQL), or to the specific software architecture (i.e., IDAL 11, interpreter 12, parser 14, cache module 15), described above. Any protocols, formats, and architectures may be used to implement the invention. Database 10 may be a local database, such as a database on storage medium 44, or it may be a remote database, e.g., located on a remote server (not shown) and accessible through a network using one or more network protocols (e.g., TCP/IP—Transmission Control Protocol/Internet Protocol). IP is described in various Internet Engineering Task Force RTFs, including RFC09050 (1985), RFC0919 (1984), RFC0922 (1984), RFC792 (1981), and RFC1112 (1984). TCP is described is described in various Internet Engineering Task Force RTFs, including RFC0854 (1983) and RFC0855 (1983).

Figure 2:
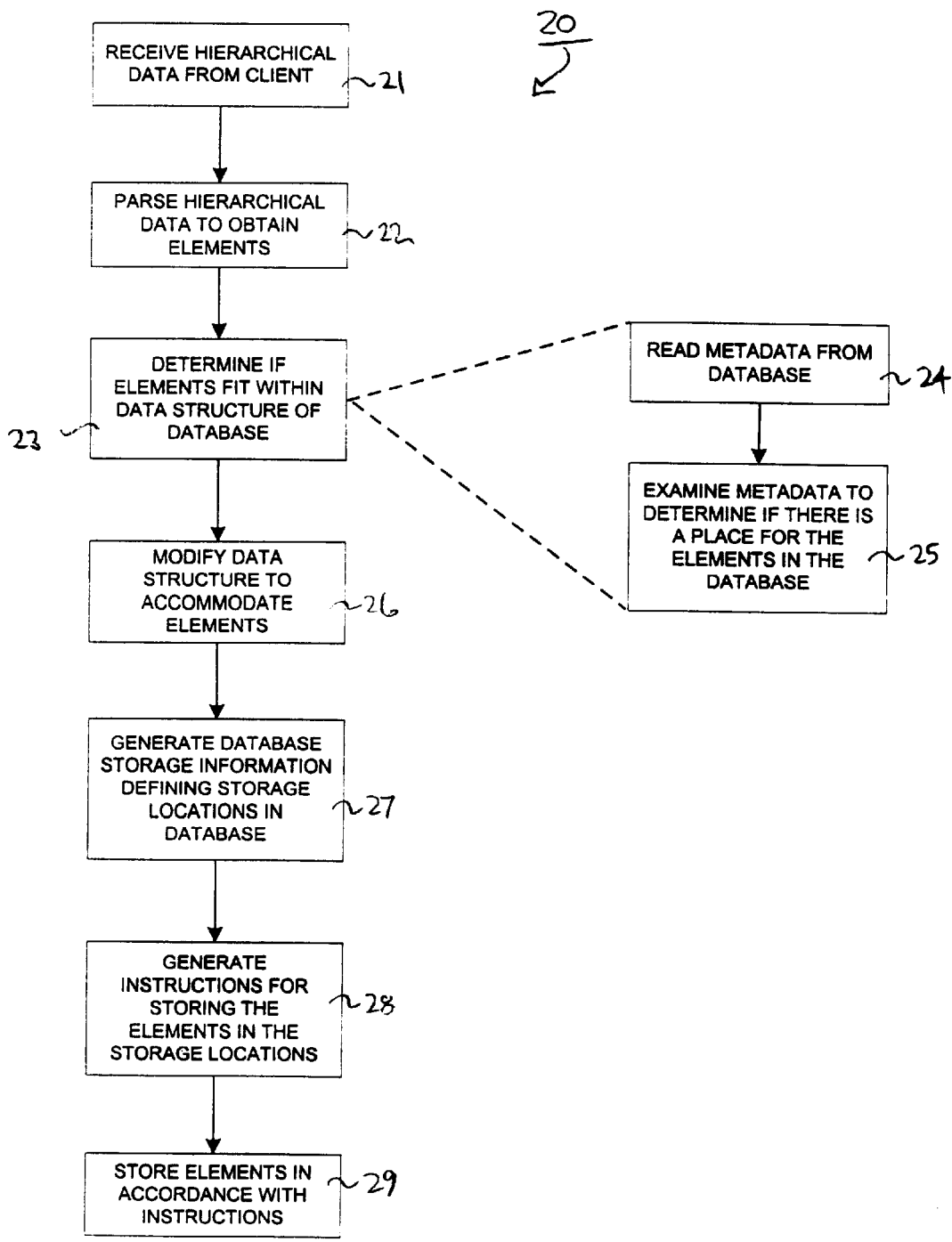
FIG. 2 is a flowchart showing the process performed by the software modules for modifying the relational database.

The invention is also not limited to the specific order of operation shown in FIGS. 2 and 3 or to the hierarchical data format (ELEMENT1.ELEMENT2 . . . ELEMENTn) described above.

Other embodiments not described herein are also within the scope of the following claims.

What is claimed is:

1. A method comprising:

obtaining elements of hierarchical data;

reading metadata that describes a data structure from a relational database, the metadata defining tables and columns in the relational database;

examining the metadata to determine if there are a table and column in the data structure that correspond to the elements; and automatically modifying the metadata, if there is not a table and column that correspond to the elements, to effectuate the modification of the relational database to include the elements.

2. The method of claim 1, wherein the relational database is modified to include the elements if the elements are not in the relational database.

3. The method of claim 1, wherein obtaining comprises:

receiving the hierarchical data from a client; and parsing the hierarchical data to obtain the elements.

4. The method of claim 1, wherein:

the data structure is comprised of at least one table having a column and a row; and modifying comprises modifying the metadata to add at least one column to the table.

5. The method of claim 4, wherein the at least one column comprises a column that stores an element of the hierarchical data and a corresponding column that stores an identifier associated with the element.

6. The method of claim 4, wherein the at least one column is added to the table by writing metadata to the data structure, the metadata defining the at least one column.

7. The method of claim 1, further comprising:

generating database storage information that defines storage locations in the relational database; and generating instructions for storing the elements in the storage locations of the relational database.

8. The method of claim 1, further comprising:

receiving instructions to read the elements from the relational database;

locating the elements in storage locations of the relational database; and generating instructions for reading the elements from the storage locations of the relational database.

9. The method of claim 1, further comprising storing the elements in the relational database.

10. An article comprising:

a readable storage medium that stores instructions that, when executed, cause a machine to:

obtain elements of hierarchical data;

read metadata that describes a data structure from a relational database, the metadata defining tables and columns in the relational database;

examine the metadata to determine if there are a table and column in the data structure that correspond to the elements; and automatically modify the metadata, if there is not a table and column that correspond to the elements, to effectuate the modification of the relational database to include the elements.

11. The article of claim 10, wherein the relational database is modified to include the elements if the elements are not in the relational database.

12. The article of claim 10, wherein obtaining comprises:

receiving the hierarchical data from a client; and parsing the hierarchical data to obtain the elements.

13. The article of claim 10, wherein:

the data structure is comprised of at least one table having a column and a row; and modifying comprises modifying the metadata to add at least one column to the table.

14. The article of claim 13, wherein the at least one column comprises a column that stores an element of the hierarchical data and a corresponding column that stores an identifier associated with the element.

15. The article of claim 13, wherein the at least one column is added to the table by writing metadata to the data structure, the metadata defining the at least one column.

16. The article of claim 10, further comprising instructions that cause the machine to:

generate database storage information that defines storage locations in the relational database; and generate instructions for storing the elements in the storage locations of the relational database.

17. The article of claim 10, further comprising instructions that cause the machine to:

receive instructions to read the elements from the relational database;

locate the elements in storage locations of the relational database; and generate instructions for reading the elements from the storage locations of the relational database.

18. The article of claim 10, further comprising instructions that cause the machine to store the elements in the relational database.

19. An apparatus comprising:

a processor that executes instructions to:

obtain elements of hierarchical data;

read metadata that describes a data structure from a relational database, the metadata defining tables and columns in the relational database;

examine the metadata to determine if there are a table and column in the data structure that correspond to the elements; and automatically modify the metadata, if there is not a table and column that correspond to the elements, to effectuate the modification of the relational database to include the elements.

20. The apparatus of claim 19, wherein the relational database is modified to include the elements if the elements are not in the relational database.

21. The apparatus of claim 19, wherein the processor obtains the elements by:

receiving the hierarchical data from a client; and parsing the hierarchical data to obtain the elements.

22. The apparatus of claim 19, wherein:

the data structure is comprised of at least one table having a column and a row; and modifying comprises modifying the metadata to add at least one column to the table.

23. The apparatus of claim 22, wherein the at least one column comprises a column that stores an element of the hierarchical data and a corresponding column that stores an identifier associated with the element.

24. The apparatus of claim 22, wherein the at least one column is added to the table by writing metadata to a data structure, the metadata defining the at least one column.

25. The apparatus of claim 19, wherein the processor executes instructions to:

generate database storage information that defines storage locations in the relational database; and generate instructions for storing the elements in the storage locations of the relational database.

26. The apparatus of claim 19, wherein the processor executes instructions to:

receive instructions to read the elements from the relational database;

locate the elements in storage locations of the relational database; and generate instructions for reading the elements from the storage locations of the relational database.

27. The apparatus of claim 19, wherein the processor executes instructions to store the elements in the relational database.

28. A method comprising:

obtaining elements of hierarchical data;

reading metadata that describes a data structure from a relational database;

examining the metadata to determine if there is a place in the data structure for the elements; and automatically modifying the metadata, in accordance with the examination, to effectuate the modification of the relational database to include the elements;

wherein the data structure is comprised of at least one table having a column and a row, modifying comprises adding at least one column to the table, the at least one column comprises a column that stores an element of the hierarchical data and a corresponding column that stores an identifier associated with the element, and the at least one column is added to the table by writing metadata to the data structure, the metadata defining the at least one column.

29. The method of claim 28, further comprising:

generating database storage information that defines storage locations in the relational database; and generating instructions for storing the elements in the storage locations of the relational database.

30. The method of claim 28, further comprising:

receiving instructions to read the elements from the relational database;

locating the elements in storage locations of the relational database; and generating instructions for reading the elements from the storage locations of the relational database.

31. The method of claim 28, further comprising storing the elements in the relational database.

32. An article comprising a machine-readable medium that stores executable instructions to:

obtain elements of hierarchical data;

read metadata that describes a data structure from a relational database;

examine the metadata to determine if there is a place in the data structure for the elements; and automatically modify the metadata, in accordance with the examination, to effectuate the modification of the relational database to include the elements;

wherein the data structure is comprised of at least one table having a column and a row, modifying comprises adding at least one column to the table, the at least one column comprises a column that stores an element of the hierarchical data and a corresponding column that stores an identifier associated with the element, and the at least one column is added to the table by writing metadata to the data structure, the metadata defining the at least one column.

33. The article of claim 32, further comprising instructions that cause the machine to:

generate database storage information that defines storage locations in the relational database; and generate instructions for storing the elements in the storage locations of the relational database.

34. The article of claim 32, further comprising instructions that cause the machine to:

receive instructions to read the elements from the relational database;

locate the elements in storage locations of the relational database; and generate instructions for reading the elements from the storage locations of the relational database.

35. The article of claim 32, further comprising instructions that cause the machine to store the elements in the relational database.

36. An apparatus comprising:

a processor that executes instructions to:

obtain elements of hierarchical data;

read metadata that describes a data structure from a relational database;

examine the metadata to determine if there is a place in the data structure for the elements; and automatically modify the metadata, in accordance with the examination, to effectuate the modification of the relational database to include the elements;

wherein the data structure is comprised of at least one table having a column and a row, modifying comprises adding at least one column to the table, the at least one column comprises a column that stores an element of the hierarchical data and a corresponding column that stores an identifier associated with the element, and the at least one column is added to the table by writing metadata to the data structure, the metadata defining the at least one column.

37. The apparatus of claim 36, wherein the processor executes instructions to:

generate database storage information that defines storage locations in the relational database; and generate instructions for storing the elements in the storage locations of the relational database.

38. The apparatus of claim 36, wherein the processor executes instructions to:

receive instructions to read the elements from the relational database;

locate the elements in storage locations of the relational database; and generate instructions for reading the elements from the storage locations of the relational database.

39. The apparatus of claim 36, wherein the processor executes instructions to store the elements in the relational database.

* * * * *